United States Patent [19]
Shellhause

[11] Patent Number: 4,544,049
[45] Date of Patent: Oct. 1, 1985

[54] WHEEL CYLINDER ASSEMBLY AND SEAL ARRANGEMENT THEREIN

[75] Inventor: Ronald L. Shellhause, Vandalia, Ohio

[73] Assignee: General Motors Corporation, Detroit, Mich.

[21] Appl. No.: 539,272

[22] Filed: Oct. 5, 1983

[51] Int. Cl.⁴ .......................................... F16D 51/24
[52] U.S. Cl. ..................................... 188/364; 92/182; 188/322.18; 277/27; 277/170; 277/177
[58] Field of Search ............... 188/364, 363, 361, 370, 188/322.18, 362, 365; 92/182; 277/70, 78, 79, 138, 144, 145, 165, 168, 170, 201, 27, 171, 172, 177

[56] References Cited

U.S. PATENT DOCUMENTS

| 1,517,593 | 12/1924 | Slate | 92/182 |
| 2,098,121 | 11/1937 | Wilkinson | 277/170 X |
| 2,603,952 | 7/1952 | Dodge | 188/364 X |
| 3,062,192 | 11/1962 | Webb | 277/165 |
| 3,109,661 | 11/1963 | Swain et al. | 277/165 X |
| 3,224,378 | 12/1965 | Graham | 92/182 X |
| 3,616,880 | 11/1971 | Shellhause | 188/79.5 GC |
| 4,346,685 | 8/1982 | Fujikawa | 92/182 X |

FOREIGN PATENT DOCUMENTS

| 3034432 | 4/1982 | Fed. Rep. of Germany | 92/182 |
| 1388318 | 12/1964 | France | 188/370 |
| 534119 | 2/1941 | United Kingdom | 277/170 |
| 615780 | 1/1949 | United Kingdom | 277/170 |

Primary Examiner—George E. A. Halvosa
Attorney, Agent, or Firm—D. D. McGraw

[57] ABSTRACT

A drum brake assembly having a wheel cylinder mounted on arms of a center guide backing plate by means of notches receiving the arms. The cylinder has pistons with low drag O-ring seals in grooves configured to provide seal forces which are aided by brake actuating pressure to assure sealing action. Wiper seals within the wheel cylinder are used in place of boots.

3 Claims, 6 Drawing Figures

WHEEL CYLINDER ASSEMBLY AND SEAL ARRANGEMENT THEREIN

The invention relates to a wheel cylinder assembly for an automotive vehicle brake and more particularly to one forming a part of a drum brake assembly in which an open backing plate provides a center guide mount for a pair of brake shoes and the wheel cylinder. The brake shoes fit over the edge portion of the backing plate and have spherical ends which serve as push rods engaging the wheel cylinder pistons. Similar brake shoe spherical ends also engage and locate the brake adjuster. Upper and lower retraction springs hold the entire assembly together. The upper retraction spring is connected to the brake shoes and through sloped apertures in the backing plate to give a return registry for the brake shoes and hold them in engagement with the wheel cylinder assembly, thereby also retaining the wheel cylinder assembly in position in a notch formed in the backing plate. The wheel cylinder acts as an anchor having a pivotal link function which permits the brake shoes to follow the drum surface.

The wheel cylinder assembly has a body with a bore extending therethrough to define a cylinder wall. Opposed wheel cylinder pistons are sealingly and reciprocably mounted in the cylinder defined by the wall and have cooperating recesses in their outer ends engaged by the spherical ends of the brake shoes. A pressure chamber is formed by the inner ends of the pistons and the center portion of the cylinder wall. A fluid brake pressure port and a bleeder port are provided in the wheel cylinder body so that they are properly connected to the pressure chamber.

Each piston is sealed relative to the cylinder wall by an O-ring seal fitting in a groove formed in the outer cylindrical surface of the piston. The groove is defined by a bottom wall and non-parallel side walls so that the open side of the groove has a greater axial length than the axial length of the bottom wall. An outer portion of one of the side walls may be parallel to the other side wall, however. Grooves or serrations are formed in circumferentially spaced relation on an angled side wall portion of the groove which is nearer the pressure chamber. The O-ring diameter and durometer are such that when the O-ring is in the groove and installed in the cylinder, it is suspended at three points. It is in slightly flattened engagement with the angled side wall portion and the opposite groove side wall. It is also in sealing engagement with the cylinder wall, but has little or no deformity at its line of engagement. This provides a sealing relationship with the piston and cylinder wall while reducing the force required to move the piston and seal relative to the cylinder wall to a nominal force value. When hydraulic pressure is exerted in the pressure chamber, it flows into the groove and through the angled side wall serrations into the area between the bottom wall and the O-ring seal to force the seal into greater engagement with the cylinder wall as the pressure increases, maintaining a complete seal during pressurization. Upon pressure release, the seal returns to its original position so that there is very little drag of the seal on the cylinder wall. The amount of drag force may be on the order of 0.5 to 2.0 pounds of force. Commonly used V-block seals in a similar seal cylinder assembly may exert a drag force of about 10–50 pounds of force.

The wheel cylinder assembly does not use wheel cylinder boots. Instead, wiper seals are secured to the outer ends of the pistons and engage the cylinder wall in sealing and wiping relation. The wiper seals may be made of split rim stainless steel, nylon or a relatively high durometer rubber-like material.

IN THE DRAWINGS

The drum brake assembly herein disclosed and employing the claimed wheel cylinder assembly feature is also disclosed in Pat. Application Ser. Nos. 539,273 and 539,107 respectively filed on even date herewith by the same inventor. The disclosures in these concurrently filed applications are therefore incorporated herein by reference.

This is an improvement in the wheel cylinder assembly of the drum brake disclosed in Applicant's U.S. Pat. No. 3,616,880, entitled "Floating Anchor-Cylinder Drum Brake with Adjuster" and issued Nov. 2, 1971.

Figure 1:
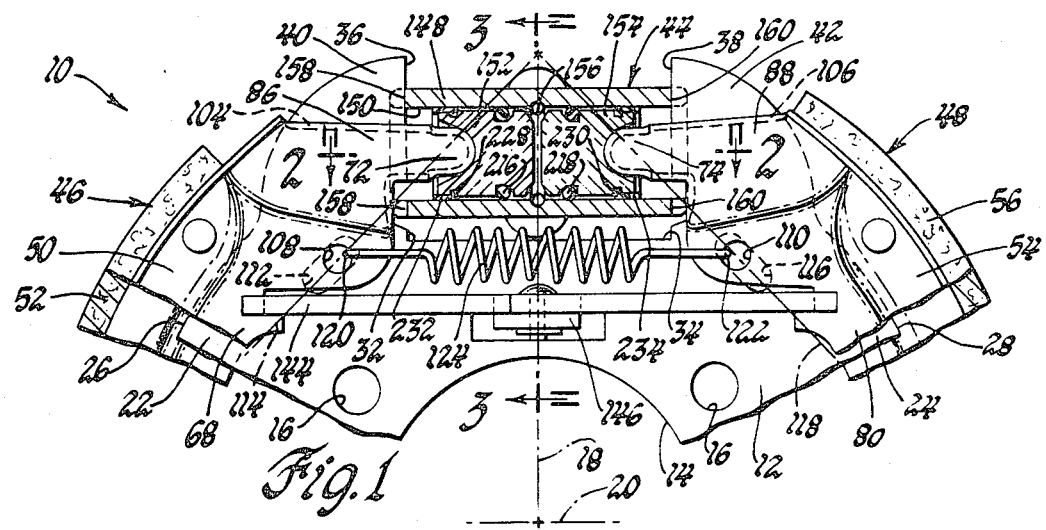
FIG. 1 is a fragmentary elevation view of a drum brake assembly embodying the invention, with parts broken away and in section.
Figure 2:
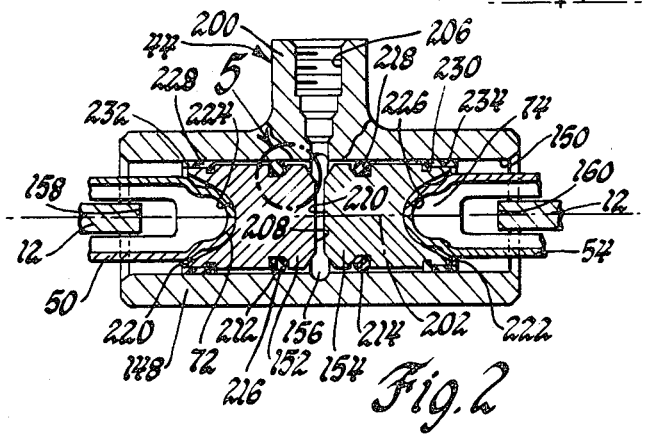
FIG. 2 is a fragmentary cross-section view of the wheel cylinder assembly of FIG. 1, taken in the direction of arrows 2—2 of that Figure and having parts broken away.
Figure 3:
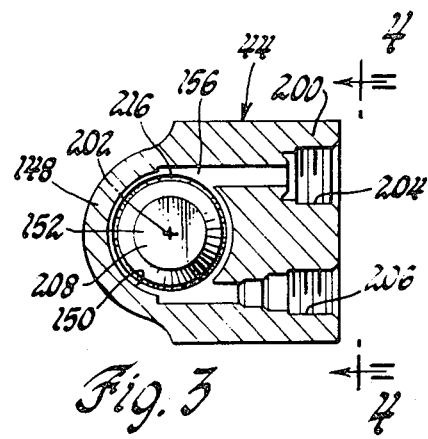
FIG. 3 is a cross-section view of the wheel cylinder assembly of FIGS. 1 and 2, taken in the direction of arrows 3—3 of FIG. 1.
Figure 4:
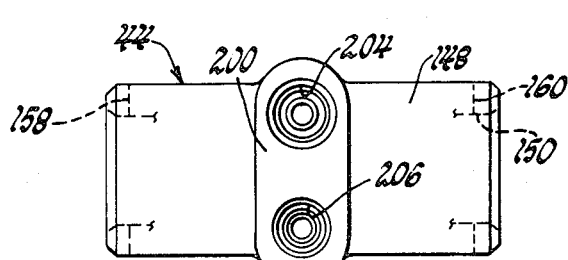
FIG. 4 is an elevation view of the wheel cylinder assembly of FIGS. 1, 2 and 3 taken in the direction of arrows 4—4 of FIG. 3.

The drum brake assembly 10 has a backing plate 12 which also functions as a center guide for the brake shoe assemblies and the wheel cylinder assembly. The backing plate 12 has a center opening 14 through which a vehicle drive axle, not shown, may extend. It is also provided with several apertures 16, two of such apertures being illustrated, through which mounting bolts are inserted to bolt the backing plate 12 to a fixed mounting flange, not shown. The mounting flange, as is well known in the art, may be secured to the outer end of a vehicle rear axle housing. If the brake is used on the front axle of a vehicle, the backing plate 12 is bolted to suitable portions of a steering knuckle and the stub axle extends through opening 14. The backing plate is symmetrically formed about the backing plate vertical diameter 18, as seen in FIG. 1. A backing plate second diameter 20 is at right angles to diameter 18 and extends horizontally as seen in FIG. 1. The opposite portions of the backing plate through which diameter 20 extends provide arcuate backing plate sections 22 and 24 respectively having edge surfaces 26 and 28. The backing plate extends downwardly about diameter 18 as more completely illustrated and described in the above noted U.S. Patent Applications. The backing plate also extends upwardly along diameter 18, terminating in a notch 32 opening upwardly. The notch has a lower edge 34 which may be parallel to diameter 20, and side edges 36 and 38. The backing plate has arm-like extensions 40 and 42 respectively defining edges 36 and 38 and extending outwardly from the arcuate sections 22 and 24 to provide for mounting and guiding the wheel cylinder assembly 44, which is received within notch 32. Extensions 40 and 42 also extend through openings in the brake shoe assemblies as more fully described in the above noted U.S. Patent Applications.

Brake shoe assemblies 46 and 48 are respectively received on the backing plate arcuate sections 22 and 24. Brake shoe assembly 46 includes a brake shoe 50 and a brake lining segment 52. Brake shoe assembly 48 includes an identical brake shoe 54 and a similar lining segment 56. In the brake assembly of FIG. 1, brake shoe assembly 46 is a primary brake shoe assembly of a duo-servo brake. A leading/trailing arrangement may be used, or wheel cylinders may be used at opposite ends of the brake shoe assemblies. These arrangements are more fully disclosed in the above noted U.S. Patent Applications.

The inner parts of brake shoe webs 68 and 80, respectively, are spaced apart to define channels which take the form of arcuate slots along the inner peripheral arc sections of the shoes 50 and 54. The outer side of the web generally round extensions 86 and 88 have some material omitted so that slots 104 and 106 are provided as upper and lower extensions of the web channels. The slot 104 of shoe 50 receives the arm-like extension 40 of backing plate 12 therethrough, as is illustrated in FIG. 1 in the assembled position. Similarly slot 106 of shoe 54 receives backing plate extension 42. The web inner parts are provided with aligned openings 108 at the upper end of shoe 50 and aligned openings 110 at the upper end of shoe 54. When assembled, as seen in Figure 1, openings 108 are in alignment with the oblong opening 112 formed in backing plate 12. The oblong opening 112 is a suitably contoured sloped slot having its major axis 114 extending at an acute angle to the backing plate first diameter 18 so that, as extended, it intersects that diameter near the upper side of wheel cylinder assembly 44. A similar oblong opening 116 with its major axis 118 is provided in the portion of the backing plate containing the arcuate backing plate section 22 and armlike extension 42. When assembled, the ends 120 and 122 of the upper retraction spring 124 extend through the openings 108 and 110 and oblong openings 112 and 116 so that they are attached to the shoes 50 and 54 and urge the shoe upper ends toward each other. The oblong openings 112 and 116 act as cam guides to give a return registry for the brake shoe assemblies 46 and 48.

A spreader bar 144 is engaged in notches in the shoe webs and arranged to be actuated by suitable linkage 146 to mechanically apply the brake as a parking brake. When the parking brake is actuated, the effective length of the spreader bar is increased by moving sections thereof in opposite directions so that the brake shoe assemblies are moved in a brake apply direction.

The wheel cylinder assembly 44 includes a body 148 which has a cylinder 150 formed therethrough. Opposed pistons 152 and 154 are sealingly and reciprocably received in cylinder 150 and have sockets formed in their outer ends which receive the respective spherical ends 72 and 74 of shoes 50 and 54. The pressure chamber 156 formed by the pistons and the cylinder is arranged to receive brake actuating fluid, as is further described below. The cylinder body ends are provided with notches 158 and 160 so that notch 158 receives the side edge 36 of arm-like extension 40 and notch 160 receives the side edge 38 of extension 42.

Details of the wheel cylinder assembly embodying the invention are more particularly illustrated in FIGS. 2 through 6. The body 148 has a boss 200 extending outwardly and generally perpendicular to the axis 202 of cylinder 150. As installed in the automotive vehicle, the bleeder port 204 is positioned in the upper portion of the boss 200 so that it connects with the top of pressure chamber 156. Brake pressure inlet 206, also formed through boss 200, extends into the wheel cylinder body and connects with brake pressure chamber 156. Pistons 152 and 154 are identically formed. Their inner ends 208 and 210 cooperate to form the movable walls of pressure chamber 156. Grooves 212 and 214 are formed in the outer cylindrical surfaces of the pistons respectively adjacent piston ends 208 and 210. O-ring seals 216 and 218 are respectively received in grooves 212 and 214. The outer ends 220 and 222 of pistons 152 and 154 are respectively provided with axially extending recesses 224 and 226 which act as sockets receiving the spherical ends 72 and 74 of brake shoes 50 and 54. The outer peripheral portions of piston ends 220 and 222 are each suitably formed with a groove and reduced diameter circumferential area in which wiper seals 228 and 230 respectively are received. The wiper seals have annular lips 232 and 234 which extend axially outward and are resiliently biased internally in a radially outward direction so that they provide a wiping action on cylinder 150 as the pistons are moved outwardly. The wiper seals may be made of nylon or a relatively high durometer rubber-like material. In some instances, they may be constructed with a split rim configuration using stainless steel. The wiper seals prevent the contamination of the working portions of cylinder 150 and prevent the entry of foreign material into the inner portion of the cylinder, protecting the O-ring seals 216 and 218 as well as the brake fluid in chamber 156.

Figure 5:
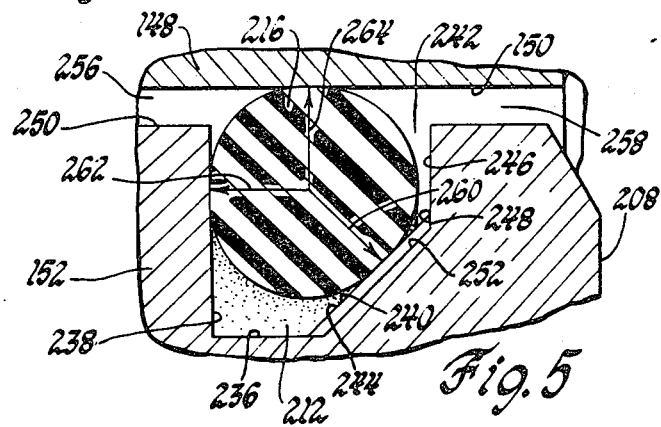
FIG. 5 is an enlarged fragmentary cross-section view of a portion of the wheel cylinder assembly of FIGS. 1 through 4, with parts broken away and taken in the area of circular arrow 5 of FIG. 2.
Figure 6:
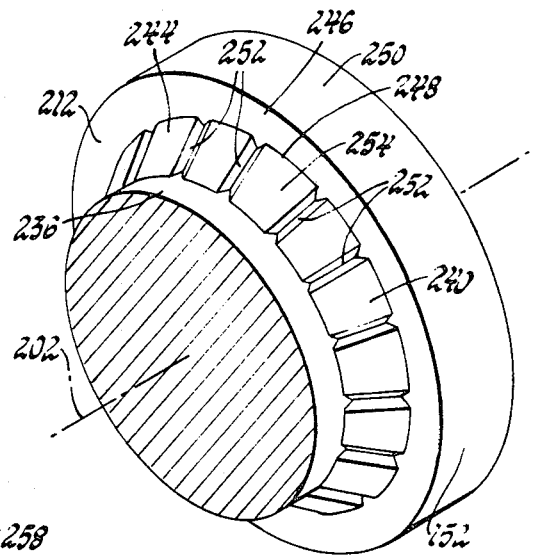
Figure 6 is a perspective view of one piston of the wheel cylinder assembly shown in the other Figures, with parts broken away.

The particular arrangement of grooves 212 and 214 and seals 216 and 218 are shown in greater detail in FIGS. 5 and 6, with only piston 152, groove 212 and seal 216 being illustrated. It is to be understood that piston 154, groove 214 and seal 218 are identical to piston 152, groove 212 and seal 216. Groove 212 is defined by a bottom wall 236, an outer side wall 238, an inner side wall 240 and the outer circumferential groove opening 242 at the outer cylindrical surface 250 of the piston. Side wall 238 is illustrated as being perpendicular to the axis 202 of the piston 152 and cylinder 150. In some instances, it may be desirable to form side wall 238 at an acute angle relative to axis 202. Inner side wall 240 is an angled side wall and is illustrated as having an angled side wall portion 244 extending outwardly from bottom wall 236 and diverging from side wall 238. Although side wall 240 may be at the same angle throughout its width, it is illustrated as having radially extending side wall portions 246 extending from the radially outer edge 248 of side wall portion 244 to the outer cylindrical surface 250 of piston 152. As illustrated in FIG. 5, side wall 238 and side wall portion 246 are parallel. The angled side wall portion 244 has serrations or grooves 252 formed therein and extending from the vicinity of outer edge 248 to the juncture of side wall portion 244 with bottom wall 236. The grooves 242 are circumferentially spaced throughout the surface of side wall portion 244 and are sufficiently few in number to reduce the surface area 254 of side wall portion 244 only slightly. The piston outer cylindrical surface 250 is somewhat smaller in diameter than the wall defining cylinder 150 so that an annular clearance 256 is provided between the piston 152 and cylinder wall 150 near groove side wall 238 and a similar annular clearance space 258 is provided near side wall 240 of the groove. These annular clearances may be of the same size. In a typical cylinder, the clearances may be on the order of 0.003 to 0.009 inches.

In order to assemble the brake, the upper ends of the brake shoe assemblies 46 and 48 are positioned so that they engage the wheel cylinder pistons. The shoe assemblies and the wheel cylinder assembly 44 are then moved downwardly over the backing plate 12 so that the wheel cylinder assembly 44 is located in notch 32 and the channels formed by the webs of the brake shoe assemblies 46 and 48 fit over the backing plate. The upper retractor spring 124 is installed with spreader bar 144 in position. An adjuster assembly, not shown, is positioned between the shoe assembly lower ends and a lower retraction spring is installed, as more fully disclosed in the above noted U.S. Patent Applications. The assembly is then complete. It will be retained in its assembled position by the retraction springs before the assembly is attached to the vehicle so that it may be handled as a unit.

The seal 216 has a cross-section area of such dimensions relative to groove 212 and cylinder 150 that, as seen in FIG. 5, it has a three-point suspension between the groove side wall 238, side wall portion 244, and the wall of cylinder 150. It is so dimensioned that it is slightly deformed when it is placed in the groove and the piston is inserted in the cylinder. As diagrammatically shown in FIG. 5, it exerts a force represented by force arrow 260 against side wall portion 244, a force represented by force arrow 262 against side wall 238, and a force represented by force arrow 264 against the wall of cylinder 150. In the particular piston arrangement illustrated, side wall 238 is perpendicular to bottom wall 246 and side wall portion 244 forms a 45° angle with bottom wall 236. Side wall portion 244 is therefore also at the same angle relative to side wall 238 and the wall of cylinder 150. Therefore the forces represented by arrows 260, 262 and 264 are equal. The forces can be made unequal and result in an increase or decrease in forces represented by arrows 262 and 264 by changing either or both of the angles of the side walls to the bottom wall. For example, changing the angle of side wall portion 244 to a lesser angle relative to bottom wall 236 will decrease the force represented by arrow 262 and increase the force represented by arrow 260, assuming the same force at arrow 260. Conversely, an increase in the angle of side wall portion 244 relative to bottom wall 236 will lessen the force represented by arrow 264. It is readily understood that side wall 238 may also be slanted so that it tends to open groove opening 242, increasing the force represented by arrow 264. This permits tailoring the drag force of the seal on cylinder 150 to a small and very precise value. In any event, these forces are preferably just sufficient to insure sealing contact of seal 216 with groove side wall 238 and the wall of cylinder 150. Because the force represented by arrow 264 is relatively slight, the drag force of the seal on the cylinder wall is reduced dramatically in relation to the drag forces exerted by the typical V-block seal in the same cylinder configuration.

When brake actuating fluid is introduced into pressure chamber 156, it acts on the piston ends 208 and 210 and also flows through annular clearances 258 into the portion of groove opening 242 between seal 216 and the groove side wall portion 246 of each piston. It flows into grooves or serrations 252 into the portion of groove 212 adjacent bottom wall 236 and radially inward of seal 216. This pressure acts on most of the circumferential surface of seal 216 from the contact line represented by the head of arrow 264 to the contact line represented by the head of arrow 262, as seen in FIG. 5. It therefore forces seal 216 radially outward and distorts it toward annular clearance 256, increasing the force exerted through the seal on groove side wall 238 and the wall of cylinder 150. These sealing forces increase with increased pressure, keeping the seal in complete sealing relation with side wall 238 and the wall of cylinder 150. In some instances, the seal may even resiliently extrude into the annular clearance 256, even more positively blocking any fluid leakage past the seal.

Upon brake release, the seal tends to recover its original shape and return to its original position illustrated in FIG. 5. It displaces hydraulic brake fluid back through grooves of serrations 252 and annular clearance 258, decreasing the forces represented by arrows 262 and 264 as the hydraulic pressure acting on the seal decreases. It therefore maintains a minimum drag force on the wall of cylinder 150 commensurate with force requirements to maintain full sealing relationship with that wall and groove side wall 238.

The embodiments of the invention in which an exclusive property or privilege is claimed are defined as follows:

1. A wheel cylinder assembly and mount therefor for a wheel brake assembly, said wheel cylinder assembly and mount comprising;
   a guide and support plate having a notch formed therein and arms defining the side walls of said notch;
   a wheel cylinder assembly including:
   a wheel cylinder body having opposite ends and a bore therethrough defining a cylinder wall;
   first and second pistons reciprocably received in said bore and having outer cylindrical surfaces, adjacent inner ends and opposite outer ends, and an axis common with said bore, said inner ends and said cylinder wall defining a pressure chamber;
   each of said pistons having a groove in the outer cylindrical surface thereof adjacent the piston inner end and defined by a bottom wall and nonparallel side first and second side walls so that the open side of the groove has a greater axial length than the axial length of said bottom wall, said first side wall having a planar surface which is perpendicular to said axis, each of said pistons further having a socket recess formed in the outer end thereof and adapted to receive means for moving a brake shoe;
   an O-ring seal in each of said grooves radially outward of said groove bottom wall and sealingly engaging each of said groove side walls and extending outwardly beyond said groove and sealingly engaging said cylinder wall;
   each of said O-ring seals being radially compressed against each of said groove side walls and said cylinder wall by three-point suspension forces so as to be slightly deformed in cross section, the amount of the suspension force acting on said cylinder wall being controlled primarily by the angles of said side walls may be relative to said cylinder wall and thus controlling the drag force of said O-ring on said cylinder wall;
   means formed in said second groove side walls which are nearer said piston inner ends providing fluid passages from said pressure chamber to transmit brake fluid actuating pressure into the spaces radially between said groove bottom walls and said O-ring seals;

and an annular wiper seal secured to the outer end of each of said pistons and engaging said cylinder wall in sealing and wiping relation;

said cylindrical body having means for introducing brake fluid under pressure into said pressure chamber to move said pistons in axially opposite directions to actuate a wheel brake assembly, said cylindrical body further having a mounting slot formed across each cylindrical body and receiving an arm of said guide and support plate to mount said wheel cylinder assembly on said guide and support plate and in said notch.

2. A wheel cylinder assembly for use in a vehicle drum brake assembly, said wheel cylinder assembly comprising:

a cylinder housing having an axially extending cylinder formed therein and defined by a cylinder wall;

an axially extending reciprocable piston coaxially received in said cylinder with radial clearance relative thereto and having an inner end forming a movable wall of a wheel cylinder pressure chamber, an outer end arranged to receive means for exerting brake actuating force on a brake shoe when said chamber is pressurized, and low drag seal means providing a dynamic fluid pressure seal between said piston and said cylinder wall, said seal means comprising:

a groove formed in said piston having a radially inward located bottom wall, a radially outward groove opening adjacent to but radially spaced from said cylinder wall, a first groove side wall nearer said piston outer end and a second groove side wall nearer said piston inner end, said first groove side wall extending perpendicularly to the axis of said cylinder, at least a substantial part of said second groove side wall extending toward said piston inner end with concurrent radially outward and axial components from said bottom wall to form an acute angle with the axis of said cylinder and said piston so that said groove opening is axially wider than is said groove bottom wall, said second side wall having circumferentially spaced serrations formed therein and extending from points adjacent said bottom wall toward said groove opening through at least a substantial part of the area of said second side wall;

and an elastomeric compressible and deformable O-ring seal fitting in said groove and of such a diameter relative to the dimensions of said groove and the radial space between said piston and said cylinder wall that said seal is spaced radially outward of said bottom wall and is in three-point suspension and sealing engagement with said first side wall and said cylinder wall and with said second side wall across said serrations, said seal defining with said serrations fluid passages under said seal at said second groove side wall, said fluid passages joining said pressure chamber and the space between said bottom wall and said seal through the annular space radially between said piston and said cylinder wall and axially between said groove and said piston inner end, said seal being slightly compressed between said seal-engaged walls to exert forces on said walls engaged by said seal to ensure fluid sealing with said cylinder wall and said first side wall, the angles of said groove side walls relative to the axis of said cylinder and piston controlling the relationship of the force values exerted on said cylinder wall and said groove side walls.

3. A wheel cylinder assembly for use in a vehicle drum brake assembly, said wheel cylinder assembly comprising:

a cylinder housing having an axially extending cylinder formed therethrough and defined by a cylinder wall;

opposed axially extending reciprocable pistons coaxially received in said cylinder with radial clearance relative thereto and having inner ends forming opposed movable walls of a wheel cylinder pressure chamber, outer ends arranged to receive means for exerting brake actuating forces on brake shoes when said chamber is pressurized, and low drag seal means providing dynamic fluid pressure seals between said pistons and said cylinder wall, each of said seal means comprising:

a groove formed in said piston having a radially inwardly located bottom wall, a radially outward groove opening adjacent to but radially spaced from said cylinder wall, a first groove side wall nearer said piston outer end and a second groove side wall nearer said piston inner end, said first groove side wall extending perpendicularly to the axis of said cylinder, at least a substantial part of said second groove side wall extending toward said piston inner end with concurrent radially outward and axial components from said bottom wall to form an acute angle with the axis of said cylinder and said piston so that said groove opening is axially wider than is said groove bottom wall, said second side wall having circumferentially spaced serrations formed therein and extending from points adjacent said bottom wall toward said groove opening through at least a substantial part of the area of said second side wall;

and an elastomeric compressible and deformable O-ring seal fitting in said groove and of such a diameter relative to the dimensions of said groove and the radial space between said piston and said cylinder wall that said seal is spaced radially outward of said bottom wall and is in three-point suspension and sealing engagement with said first side wall and said cylinder wall and with said second side wall across said serrations, said seal defining with said serrations fluid passages under said seal at said second groove side wall, said fluid passages joining said pressure chamber and the space between said bottom wall and said seal through the annular space radially between said piston and said cylinder wall and axially between said groove and said piston inner end, said seal being slightly compressed between said seal-engaged walls to exert forces on said walls engaged by said seal to ensure fluid sealing with said cylinder wall and said first side wall, the angles of said groove side walls relative to the axis of said cylinder and piston controlling the relationship of the force values exerted on said cylinder wall and said groove side walls;

and wiper seals on said piston outer ends engaging said cylinder wall in wiping relation to prevent foreign matter from entering said cylinder in the cylinder area between said wiper seals.

* * * * *